(12) United States Patent
Carter et al.

(10) Patent No.: US 7,376,741 B1
(45) Date of Patent: May 20, 2008

(54) SYSTEM FOR ABORTING RESPONSE TO CLIENT REQUEST IF DETECTING CONNECTION BETWEEN CLIENT SERVER IS CLOSED BY EXAMINING LOCAL SERVER INFORMATION

(75) Inventors: Richard J. Carter, Menlo Park, CA (US); Ludmila Cherkasova, Sunnyvale, CA (US)

(73) Assignee: Hewlett-Packard Development Corporation, L.P., Houston, TX (US)

( * ) Notice: Subject to any disclaimer, the term of this patent is extended or adjusted under 35 U.S.C. 154(b) by 683 days.

(21) Appl. No.: 09/272,810

(22) Filed: Mar. 19, 1999

(51) Int. Cl.
*G06F 15/16* (2006.01)
(52) U.S. Cl. .................. 709/228; 709/227; 709/237
(58) Field of Classification Search ........... 709/310, 709/227, 228, 229, 230, 237, 248, 224; 706/49; 702/178; 370/389
See application file for complete search history.

(56) References Cited

U.S. PATENT DOCUMENTS

| | | | | |
|---|---|---|---|---|
| 5,402,526 A | * | 3/1995 | Bauman et al. | 709/49 |
| 6,125,401 A | * | 9/2000 | Huras et al. | 709/310 |
| 6,163,812 A | * | 12/2000 | Gopal et al. | 709/310 |
| 6,178,450 B1 | * | 1/2001 | Ogishi et al. | 709/224 |
| 6,202,036 B1 | * | 3/2001 | Klein et al. | 702/178 |
| 6,563,821 B1 | * | 5/2003 | Hong et al. | 370/389 |

* cited by examiner

*Primary Examiner*—Le Luu

(57) ABSTRACT

An HTTP server is programmed to detect timed-out client requests by inferring states of its client-server connections. These connections, being full-duplex, can each be viewed as including a client-to-server channel and a server-to-client channel. The state of the server-to-client channel can be inferred by examining local server information to determine whether the client-to-server channel is still established. The server processes a request by a client if the inferred state indicates that the server-to-client channel is still established, and the server terminates the client request if the inferred state indicates that the server-to-client channel is no longer established. Consequently, the server does not expend resources by processing timed-out or dead client requests.

22 Claims, 7 Drawing Sheets

FIG. 8
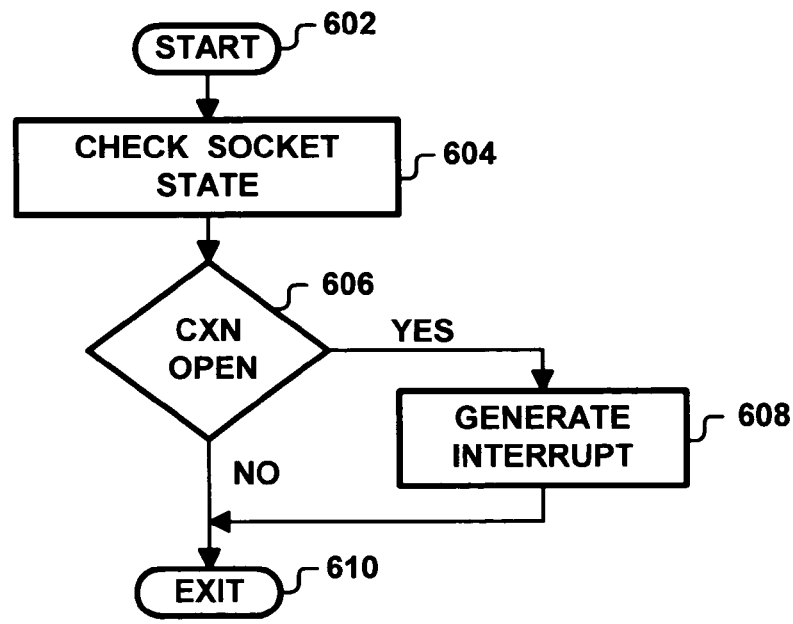
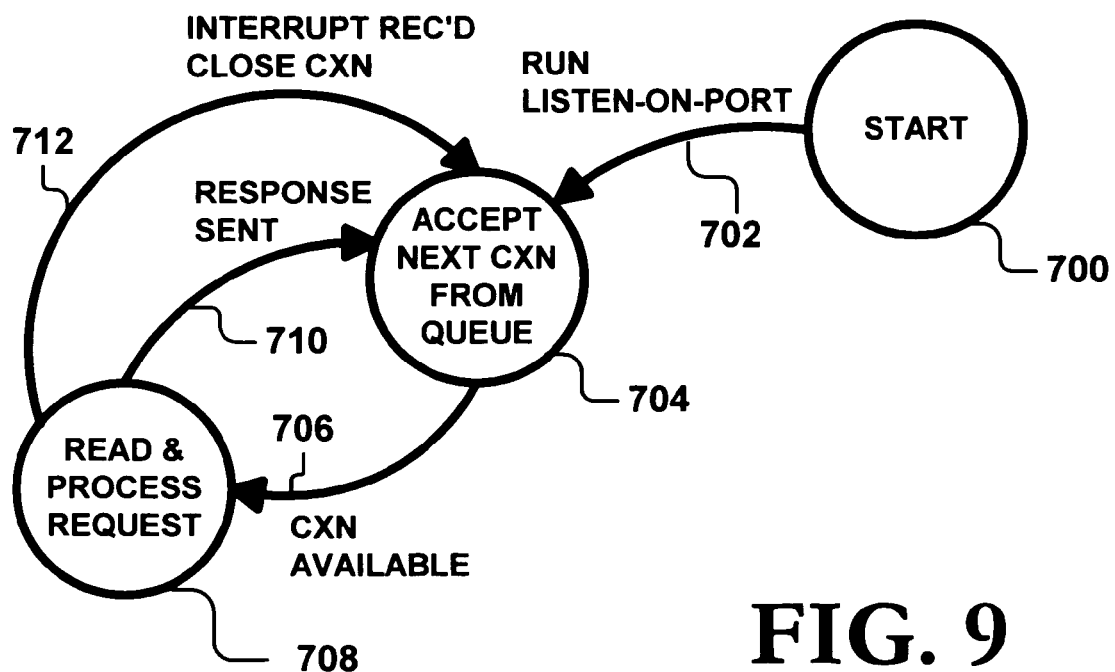
FIG. 9

SYSTEM FOR ABORTING RESPONSE TO CLIENT REQUEST IF DETECTING CONNECTION BETWEEN CLIENT SERVER IS CLOSED BY EXAMINING LOCAL SERVER INFORMATION

BACKGROUND OF THE INVENTION

The invention relates to network servers. More specifically, the invention relates to methods by which a network server processes client requests.

The World Wide Web is experiencing a phenomenal growth. Many companies are deploying web servers, with some web sites becoming extremely popular. Many web sites now offer web content that is quite diverse, ranging from news to entertainment to advertising to electronic commerce. No end to this growth appears to be in sight.

A web site may be accessed by a "client" such as a personal computer running a web browser program that is capable of connecting to the Internet. Referring to FIG. 1, a user enters a Uniform Resource Locator ("URL") of the web site into the client (10). As a result, the client attempts to make a connection with the server (12 and 14) and, if successful, sends a client request (e.g. for web content) to the server (16 and 18). Under ideal conditions, the client receives a response back from the server and displays the requested web content to the user (20 and 22).

A popular web site might receive large bursts of client requests at any given time. A high-performance, high-capacity HTTP (a.k.a. "web") server is typically configured to process a limited number of these requests concurrently. Any additional pending requests (and their associated connection information) is temporarily buffered by the server in its "listen queue". The capacity of the listen queue is often set to a large value to accommodate bursts of traffic and to accept as many client requests as possible. In servicing client requests, web applications running on the web server might provide both static and dynamic content, performing complex database queries and other data-manipulation. These can lead to a large variance in request service times. Congested and overloaded Internet routes only add to this variance: the download time for a given document can range from 5% to 500% of its typical latency.

Long delays typically cause users to cancel and possibly resubmit their requests. Such user behavior is also illustrated in FIG. 1. If a user experiences a long response delay after sending a request to a web server, that user might exhibit one of the following behaviors: "patient behavior" whereby the user waits patiently for the response no matter how long it takes; "anxious behavior" whereby the user is anxious to receive the response and clicks the browser "stop" button (24 or 26), followed by the browser "reload" button to resend the request (10 and 12); and "impatient behavior" whereby the client is not tolerant of the delay, clicks the browser "stop" button (28 or 30) and leaves the site (32), loosing interest in the content because it took too long to receive.

Since timed-out requests are not removed from the listen queues of current web servers, their processing could lead to a substantial expenditure of server resources. Although patient behavior is the most desirable behavior from the standpoint of preserving web server efficiency, it is not the most typical client behavior. More often, clients exhibit the anxious or impatient behaviors. Consequently, an overloaded web server could end up processing a lot of "dead", timed-out requests. While the web server is processing these dead requests, it is expending its resources on useless work instead of devoting its resources towards "still-vital" requests.

Those still-vital requests at the end of the listen queue encounter ever-longer delays that exceed the patience threshold of the client making the request. The server would be "busily" processing only dead requests and would not be doing any useful work. This could create a snowball effect in which all requests time out before being serviced. This pathological system state will be referred to as "request-timeout livelock." Request-timeout livelock is more likely to occur in listen queues having large capacities.

In practice, request-timeout livelock is not easily recognizable. Typically, a server detects that the client request has timed out by sending a response to the client. If the client has timed out, the client typically receives a first packet of the response and returns an error message to server, the message explicitly notifying the server that the connection between the server and the client is closed. After processing the error message, the server stops sending the remaining packets of the response. However, the server work involved in preparing the response was not avoided. Server resources were still expended on preparing useless responses and the chance of request-timeout livelock still existed.

There is a need to improve efficiency of web servers so they do not expend resources by processing timed-out requests. There is also a need to protect against request-timeout livelock.

BRIEF DESCRIPTION OF THE DRAWINGS

FIG. 8 is a flowchart of an operating system auxiliary routine for a fourth routine that can be executed by the server; and FIG. 9 is a state diagram of the fourth routine.

DETAILED DESCRIPTION OF THE INVENTION

Figure 1:
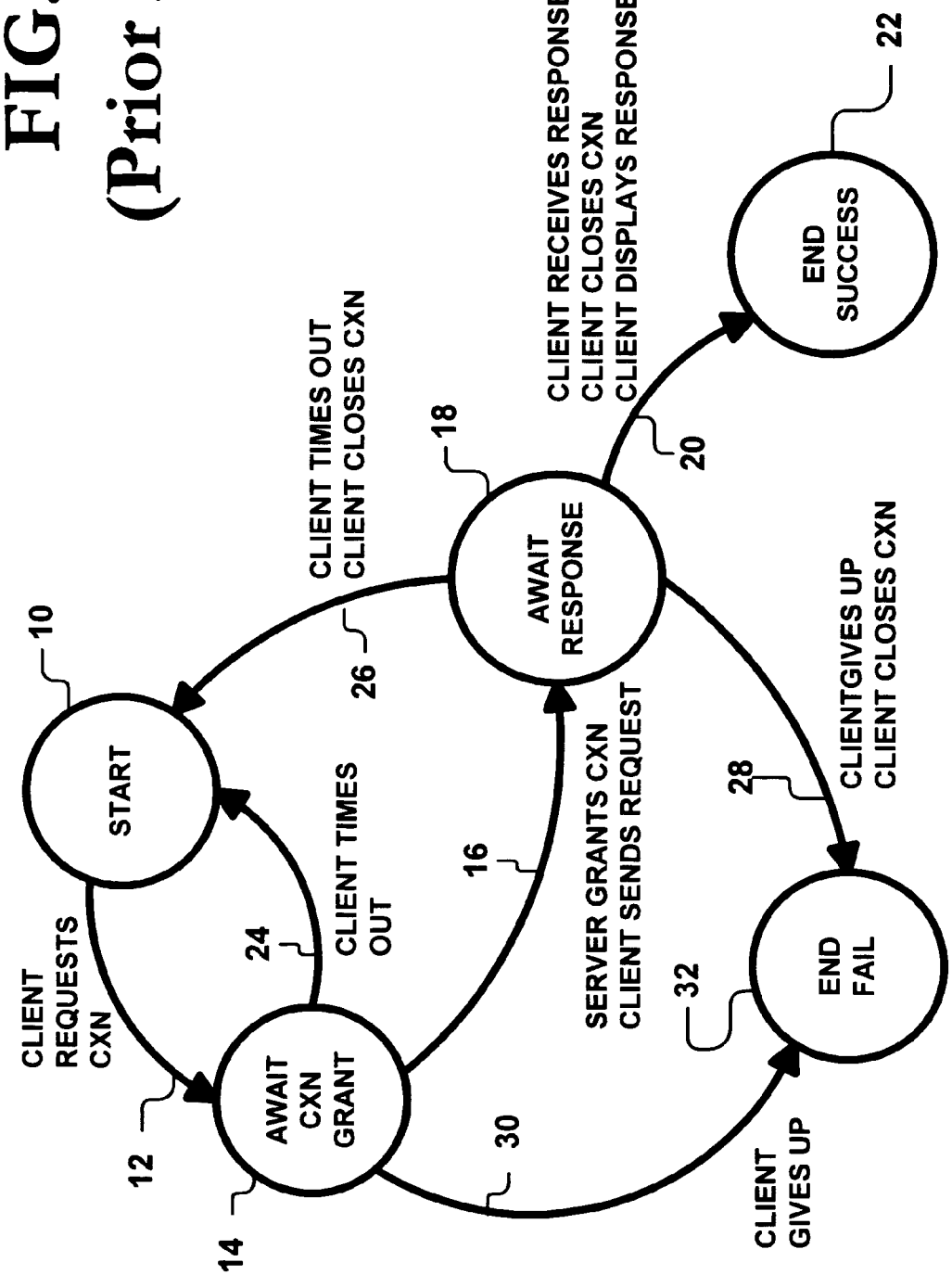
FIG. 1 is a state diagram of a client that is attempting to download content from an HTTP server.

As shown in the drawings for purposes of illustration, the present invention is embodied in a server that uses local server information to detect timed-out client requests. The server can detect timed-out client requests with little computational overhead. Therefore, the server can afford to check whether a response to a client's request is still needed before expending server resources on generating a response to that request. The amount of computational resources spent on processing dead requests is reduced and, consequently, server efficiency is increased. Moreover, protection against request-timeout livelock is provided.

Figure 2:
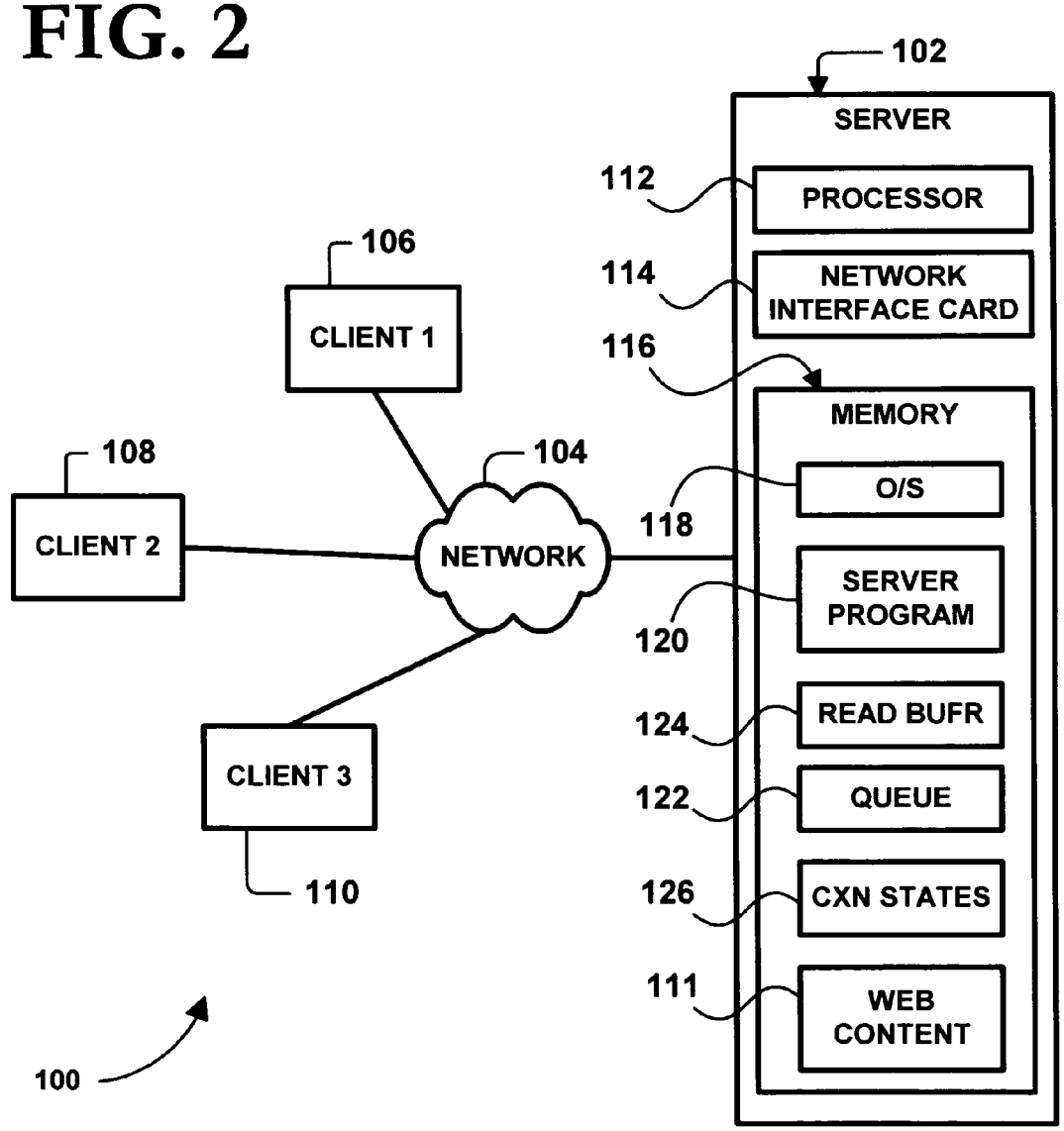
FIG. 2 is an illustration of a computer network including a network server according to the present invention.

Reference is made to FIG. 2, which shows a system 100 including a server 102 that is connected to a network 104 and a number of clients that are connectable to the network 104. The network 104 could be anything from a local area network to the Internet. Any type of network layer, data link layer and physical layer of the network 104 could be used. For example, the physical and data link layers of the network 104 could be Ethernet or Token Ring, and the network layer could use Internet Protocol ("IP").

A transport layer of the network 104 follows the Transport Control Protocol ("TCP"). A session layer follows the Hypertext Transport Protocol ("HTTP") in the preferred embodiment, although the invention is not so limited.

Any number of clients can connect to the network 104. Three clients 106, 108 and 110 are shown by way of example. The clients 106, 108 and 110 can communicate with the server 102 via dial-up connections, LAN connections, etc. The clients could include any type of device that can communicate with the server 102 over the network 104. Such devices include, without limitation, personal computers, personal digital assistants, workstations, web proxies, and Internet "Appliances."

A client such as a personal computer may communicate over the network 104 by using a TCP/IP protocol and running a web browser program such as the "Netscape Navigator" browser program (from Netscape Corporation) or the "Internet Explorer" browser program (from Microsoft Corporation). The web browser program allows a user to download and display web content 111. The web content 111 might include a static web page, a dynamic web page, a Java applet, database information, etc.

The server 102 includes a central processing unit ("CPU") 112, a network interface card 114, and short term storage (e.g., DRAM, SRAM), and long term storage (e.g. one or more hard drives), which are shown collectively as memory 116. Stored in the memory 116 is an operating system ("O/S") 118 and a server program 120. Both the operating system 118 and the server program 120 are executed during operation of the server 102.

A client may download web content 111 from the server, first by requesting a network connection with the server and then later, after the network connection has been established, by sending a request to the web server (which could be, for example, a request for a static document, or a cgi script).

The network interface card 114 receives the request for a connection and generates a CPU interrupt, which causes the server 102 to execute an O/S service routine. The O/S service routine, through additional interactions with the client, establishes the connection and places the connection in a listen queue 122.

Figure 3:
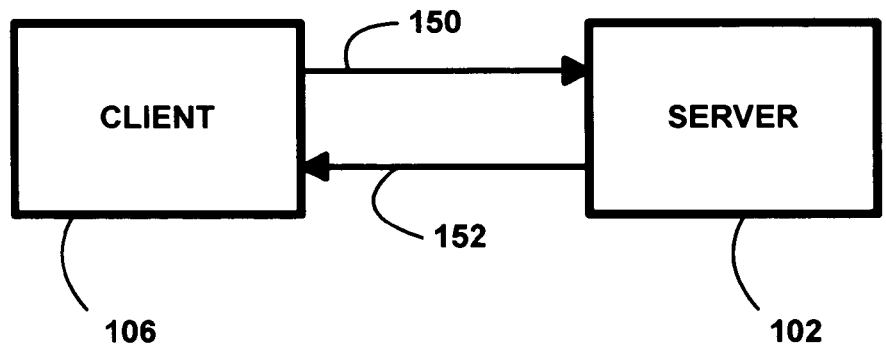
FIG. 3 is an illustration of a connection between the server and a client.

Running on top of the operating system 118 is the server program 120, an HTTP daemon such as Netscape Corporation's "ns-httpd" server program or the Apache "httpd" server program. Each client-server connection in the listen queue 122 is a full-duplex communication path that logically includes two unidirectional communication "channels": a client-to-server channel 150 and a server-to-client channel 152 (see FIG. 3). The state of the connection is maintained within the O/S 118 but can be referenced by the server program using a "socket descriptor".

Once a connection is established, it is placed in the server's listen queue 122. Connections from the listen queue 122 and their associated client requests are processed in some (typically FIFO) order. Since the server 102 might not be able to process a client's request immediately, the client might time out before the server 102 can prepare and send a response to the request. If the client times out and no longer desires the response, it will (under the rules of HTTP) terminate the connection by closing both the client-to-server and server-to-client channels 150 and 152. Conversely, if the client still desires the response, the client will keep both these uni-directional channels 150 and 152 open. Thus, the server 102 can infer the state of the server-to-client channel 152 from the state of the client-to-server channel 150.

The server 102 responds to a client request on a network connection by examining local server information to determine whether a client-to-server channel 150 of the network connection is still established. The server 102 then infers a state of the server-to-client channel according to whether the client-to-server channel is still established. The server 102 processes the client request if the inferred state indicates that the server-to-client channel is still established. The server 102 terminates the client request if the inferred state indicates that the server-to-client channel is no longer established.

The strategy of checking the "health" of the connection before the request's response generation has begun will be referred to as a "DTOC" (Detecting Timed-Out Client-Requests) strategy. The strategy of checking the health of the connection before and during the request's response generation will be referred to as a "DTOC+" strategy.

By inferring the health of the connection, the server 102 saves computational time in preparing a response for a client that has already timed out. Instead, the server 102 is able to devote its computational resources to processing responses for still-vital requests. Consequently, server efficiency is improved and situations such as server "livelock" are avoided.

Figure 4:
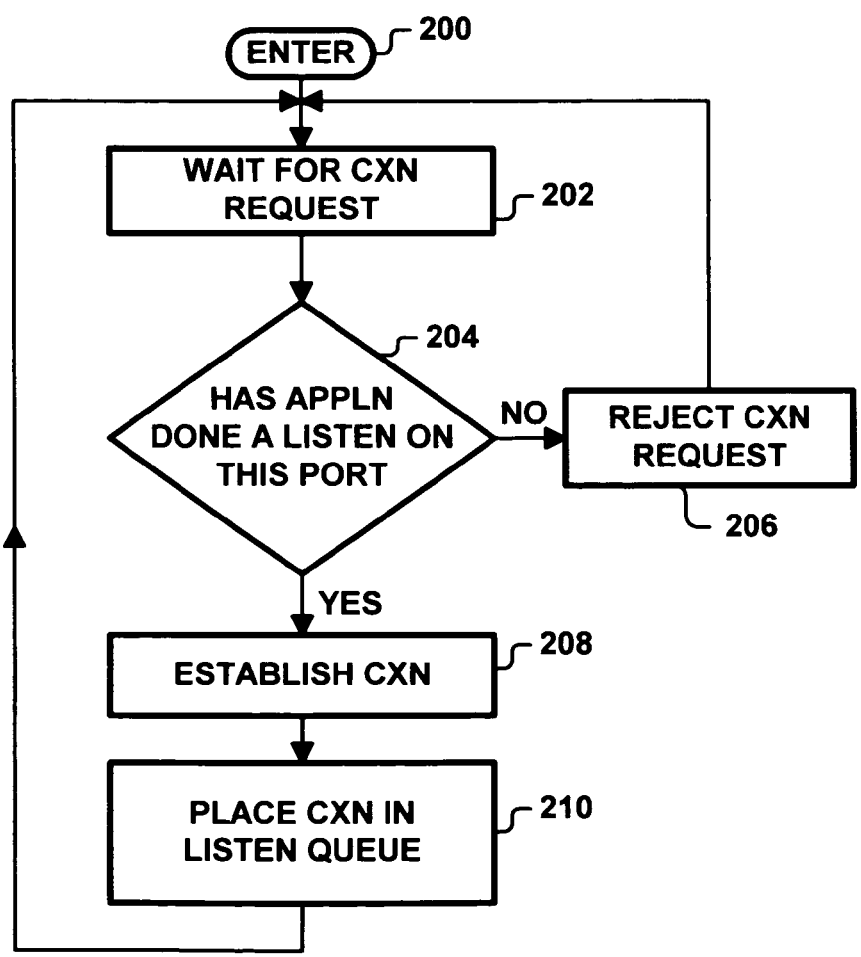
FIG. 4 is a flowchart of steps performed by an operating system service routine that is run on the server.

Reference is now made to FIG. 4, which shows the O/S service routine in greater detail. The service routine is run as a background daemon in operating system space (block 200). The service routine commands the server 102 to wait for a connection request (block 202). When the network interface card 114 generates a CPU interrupt indicating that it has received a connection request, the server 102 first determines whether the server program 120 has instructed the server 102 to execute a listen-on-port function for the port being specified (block 204). By executing the listen-on-port function, the server 102 accepts connection requests on the designated port. If the listen-on-port function has not yet been executed for the port specified in the connection request or the listen queue 122 is full, the server 102 rejects that connection request (block 206). If the listen-on-port function has been executed for the port specified in the connection request and the listen queue 122 is not full, the server 102 establishes a connection (block 208), places the connection in a listen queue (block 210), and awaits the next connection request (block 202).

Figure 5:
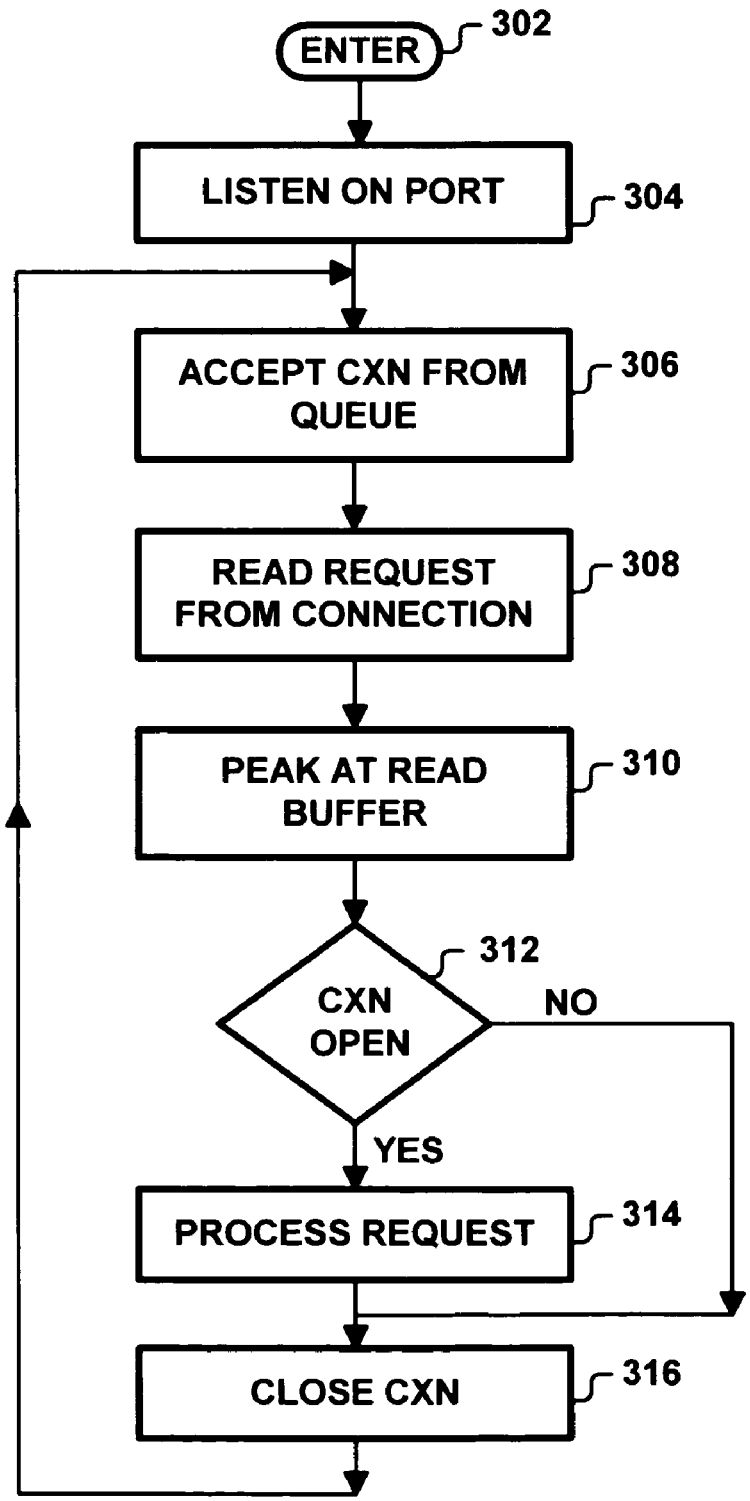
FIG. 5 is a flowchart of a first routine that can be executed by the server.
Figure 6:
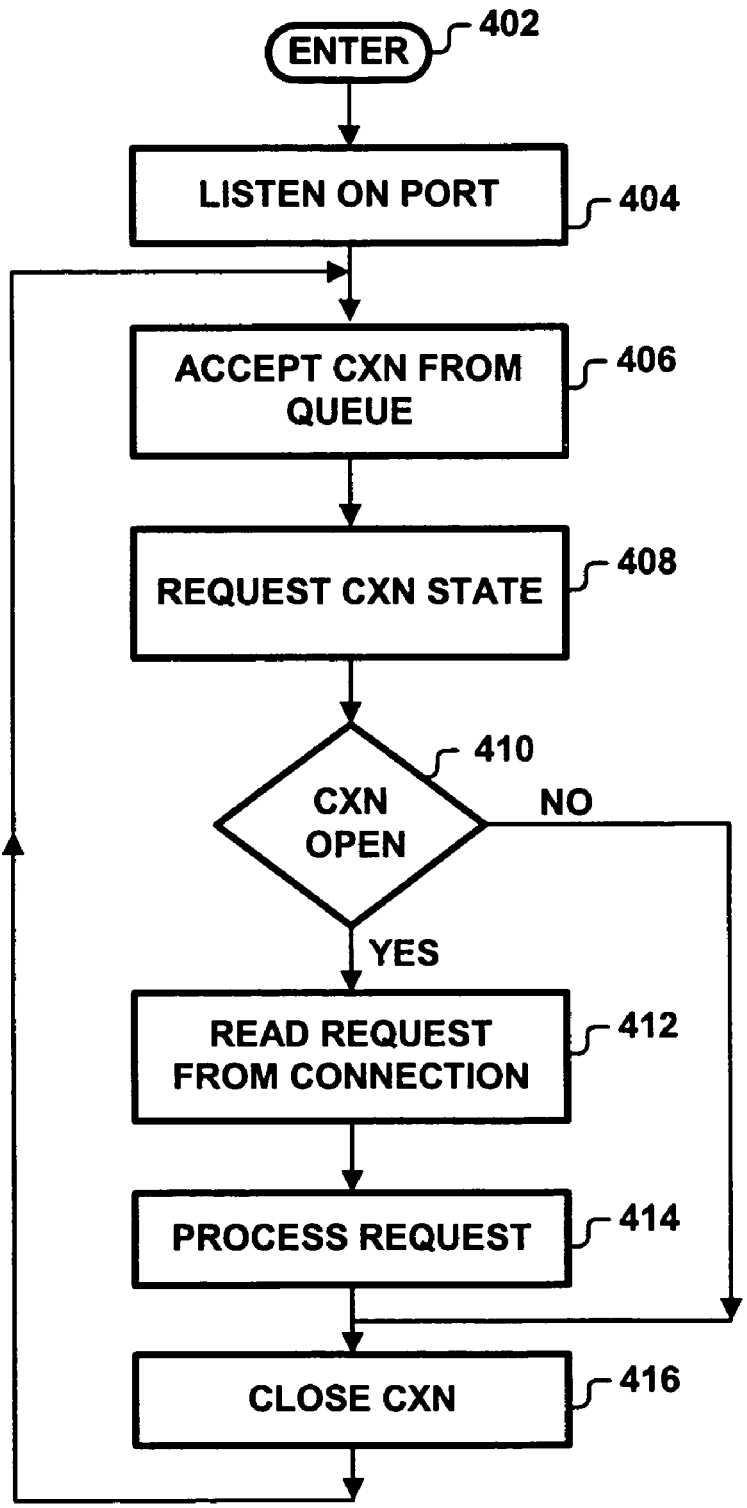
FIG. 6 is a flowchart of a second routine that can be executed by the server.
Figure 7:
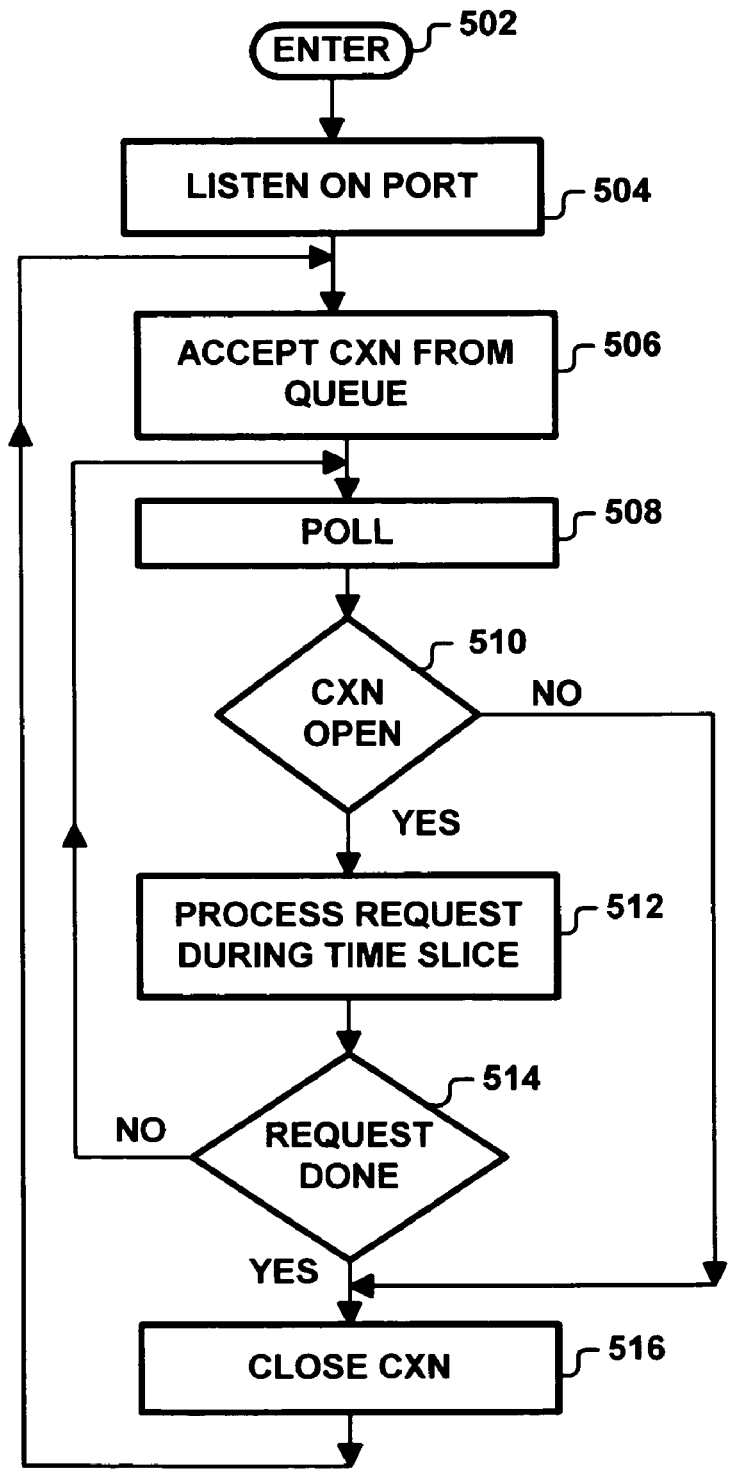
FIG. 7 is a flowchart of a third routine that can be executed by the server.

FIGS. 5 to 7 show three alternative server routines, each of which may be run as a background daemon in application space. The server program 120 may include one of the three routines. Each routine commands the server 102 to examine local information to determine the state of the client-to-server channel and subsequently infer the state of the server-to-client channel.

Reference is now made to FIG. 5, which illustrates steps executed by the server 102 under the direction of the first server routine. Upon entry (block 302), the server 102 executes a listen-on-port function to indicate to the O/S routine that it should begin accepting incoming connection requests (block 304). The server 102 then accepts an established connection from the listen queue 122 (block 306). If the listen queue 122 is empty, the server 102 blocks until a new established connection is inserted into the listen queue 122. The server 102 then reads a request from the connection (block 308). If the client has not yet sent the request over the client-to-server channel, the server 102 will wait until such time as the request can be read from the read buffer 124 (see FIG. 2).

If the client at this point times out and closes the client-to-server channel of the network connection, an indication of this action is sent to the server 102 (with TCP, this indication is called a "FIN" packet). The server 102 stores this indication as a change of its local state. The server 102 can detect this local state change via further probing of the read buffer state (block 310). If a probe of the read buffer state indicates that the client-to-server channel is closed (block 312), the server 102 infers that the server-to-client channel is also no longer established. Therefore, the server 102 closes the connection (block 316) and accepts another established connection (block 306).

If the probe of the read buffer state indicates that the client-to-server channel is still open (block 312), the server 102 infers that the server-to-client channel is still established and, therefore, prepares a response to the request and sends the response to the client via the server-to-client channel (block 314). After the response has been sent, the server 102 closes the connection (block 316) and accepts another established connection (block 306).

For example, a server running an "HP-UX 10.20" operating system can read the read buffer state at a point when the client request has been read by performing the following software steps:

(a) Placing the connection in NON-BLOCKING mode using fcntl( ) or ioctl( );
(b) Doing a recv( ) call using a flags parameter value of MSG_PEEK; and
(c) Restoring the connection to its prior mode.

A read( ) or recv( ) function call on a connection that has been put in "non-blocking" mode will return to the caller even if there are no bytes available to be read. The recv( ) call produces a return code that indicates the number of bytes read, which would be zero for the case of a closed client-to-server channel. In contrast, the return code for an open connection with no bytes waiting would be −1 with errno=EAGAIN. If the client has sent additional bytes past the logical end of the request, as might be the case of pipelined requests on persistent connections, the return code would be greater than zero. Note that the MSG_PEEK setting of the flags parameter avoids disturbing these bytes in the read buffer 124. In summary then, the return value of the recv( ) call can be used to uniquely distinguish the closed client-to-server channel case and hence a timed-out request.

Reference is now made to FIG. 6, which illustrates steps executed by the server 102 under the direction of the second server routine. Upon entry (block 402), the server 102 executes a listen-on-port function to indicate to the O/S service routine that it should begin accepting incoming connection requests (block 404). The server 102 then accepts an established connection from the listen queue 122 (block 406). If the listen queue 122 is empty, the server 102 blocks until a new established connection is inserted into the listen queue 122.

If the client at this point times out and closes the client-to-server channel of the network connection, an indication of this action is sent to the server 102. The server 102 stores the indication as a change of its local state. The server 102 can detect this local state change by directly requesting this connection state information stored in a location 126 in server memory 116 (see FIG. 2). From this state information, the server 102 infers whether the server-to-client channel is closed (block 408). With the TCP protocol, if the connection is in the CLOSE_WAIT state, the server 102 infers that the server-to-client channel is closed.

For example, a server 102 running the HP-UX 10.20 operating system has a getsockopt( ) system call which is commonly used by applications to probe the status and control settings of a connection. For such a server that incorporates O/S patch PHNE_14492, the server 102 can explicitly request the connection state by calling the getsockopt( ) system call as follows:

getsockopt (sockfd, IPPROTO_TCP, TCP_STATE, (char *) &tcp_state, &tcp_state_len)

The system call is passed a variable sockfd, which is a reference to the connection called a socket descriptor. Such a call returns the connection state in the variable tcp_state. The test (tcp_state==TCPS_CLOSE_WAIT) can be used to detect that the client-to-server channel is closed. Equivalent procedures may be found in API sets of other operating systems.

If the returned state shows that the client-to-server channel is closed (block 410), the server 102 infers that the associated server-to-client channel is also closed. The server 102 then closes the connection (block 416) and accepts another established connection (block 406). Conversely, if the returned state shows that the client-to-server channel is still established (block 410), the server 102 infers that the associated server-to-client channel is also still established.

The server 102 then reads a request from the connection (block 412), prepares a response to the request and sends the response to the client via the server-to-client channel (block 414), closes the connection (block 416) and accepts another connection from the listen queue 122 (block 406).

Reference is now made to FIG. 7, which illustrates steps executed by the server 102 under the direction of the third server routine. Upon entry (block 502), the server 102 executes a listen-on-port function to indicate to the O/S service routine that it should begin accepting incoming connection requests (block 504). The server 102 then accepts an established connection from the listen queue 122 (block 506). If the listen queue 122 is empty, the server 102 blocks until a new established connection is inserted into the listen queue 122. Once a connection becomes available, the server 102 performs polling (block 508) to determine whether the server-to-client channel is still established (block 510). The polling may be performed by peeking at the read buffer (once the request has been read and as described above in connection with FIG. 5) or by checking the socket state (as described above in connection with FIG. 6). The polling creates time slices during which a request is processed. During the processing, the request is read from the connection, a response to the request is prepared, and the response is sent to the client making the request (block 512). If the processing of a request is not finished during a time slice (that is, the processing is interrupted by the polling) (block 514), the processing is completed during one or more subsequent time slices, provided that the server-to-client channel remains established (block 510).

If at any time the polling (block 508) indicates that the server-to-client channel is no longer established (block 510), the processing of the request is stopped. The server 102 closes the connection (block 516) and accepts another established connection (block 506).

Reference is now made to FIGS. 8 and 9. FIG. 8 shows steps performed by the server 102 under the direction of an O/S auxiliary routine, in which the server 102 generates an interrupt after having inferred that the server-to-client channel is no longer established. Upon entry (block 602), the server 102 infers the health of the server-to-client channel (block 604) by peeking at the read buffer (as described above in connection with FIG. 5) or by checking the connection state (as described above in connection with FIG. 6). If the server 102 infers that the server-to-client channel is no longer established (block 606), the server 102 generates an interrupt (block 608) and exits (block 610). The O/S kernel auxiliary routine may be run periodically as a background daemon in operating system space.

FIG. 9 shows steps performed by the server 102 under the direction of a fourth server routine, in which the server 102 reads and processes a request until the interrupt is generated. Upon entry (state 700), the server 102 executes a listen-on-port function (action 702) and accepts a connection from the listen queue 122 (state block 704). If the listen queue 122 is empty, the server 102 blocks until a new established connection is inserted into the listen queue 122. Once a connection becomes available (event 706), the server 102 reads and processes a request from the connection (state 708). If a response to the request is completed (action 710), the server 102 accepts another established connection (state 704). If the interrupt (event 712) is generated during the processing, the server 102 stops the processing of the request, closes the connection and accepts another connection from the listen queue 122 (state 704).

There are a number of possible implementations of this interrupt-driven approach. For example, on a server running an HP-UX 10.20 operating system, an extension to the Unix signal-handling mechanisms could be built by defining a new signal that would be generated when a connection transitions to the CLOSE_WAIT state. This could be performed by augmenting the setsockopt ( ) function to set up a call-back function as part of the connection's socket descriptor state. In both cases, the call-back function would know either implicitly or through passed parameters which connection and process/thread were involved.

Thus disclosed is a network server 102 that can detect timed-out client requests with little computational overhead. Therefore, the server 102 can afford to check whether a response to a client's request is still needed before expending server resources on generating a response to that request. The amount of computational resources spent on processing dead requests is reduced and, consequently, server efficiency is increased. This is especially true when there is significant server processing before any response is sent to the client, or when a sizable fraction of the response would be sent out before any connection-closed notification could be received back from the client. Moreover, the network server 102 provides protection against request-timeout livelock.

The server 102 according to the present invention could be used, without limitation, as a web server, a front end server for business applications in a three-tier design, and a web proxy server. As a web proxy, the server 102 would serve as the intermediate tier between the clients (browsers) and other web servers. Typically, web proxies are used as firewalls and network caches. A web proxy intercepts a client request destined for an origin server and checks whether a requested document (the response) is already cached in the web proxy. If the requested document is already cached, the web proxy could satisfy the request locally without sending the request to the origin server. If the requested document is not found to be cached, the web proxy (on the client's behalf) sends the request to the origin server and waits for the response, which will be forwarded to client after that.

The DTOC+ strategy might be more beneficial for use in web proxy servers because the multi-tier architecture creates a higher probability of requests timing out during the processing. Additionally, the DTOC+ strategy allows processing of the client request to be terminated once the close of the server-to-client channel is detected.

The invention is not limited to the specific embodiments described and illustrated above. For instance, the invention is not limited to the HTTP session layer and the TCP transport layer.

The server may contain one or more listen queues for client-server connections. A single listen queue was shown merely to simplify the explanation of the invention.

The server may allow multiple processes to follow the server program. A single thread of the server program was described to simplify the explanation of the invention. The frequency at which the third server routine performs polling is implementation-dependent. Similarly, the frequency at which the O/S auxiliary routine is executed is also implementation-dependent.

Although specific implementations above were described in connection with an HP-UX operating system, the invention may be applied to other UNIX-based operating systems such as Solaris and Linux and non-UNIX operating systems such as Windows NT. The methods of detecting closed client-server connections may be modified according to different operating systems and implementations of the transport layer.

The DTOC and DTOC+ strategies may be performed dynamically. For example, the DTOC or DTOC+ strategy might only be performed on the connections from the listen queue when the server is overloaded (i.e. when the server utilization is higher than a specified utilization threshold). As another example, the DTOC or DTOC+ strategy might be performed on requests having a processing time that exceeds a specific duration threshold.

Therefore, the invention is not limited to the specific embodiments described and illustrated above. Instead, the invention is construed according to the claims that follow.

What is claimed is:

1. A method comprising:
    establishing a network connection between a server and an external client, the network connection including a client-to-server channel and a server-to-client channel;
    receiving at the server a request from the client for a response by the server;
    before preparing a response to the client request, the server examining local server information to determine whether the client-to-server channel of the network connection with the requesting client is still established; and
    the server not preparing the response to the client request if the client-to-server channel is determined to be no longer established.

2. The method of claim 1, wherein a state of the server-to-client channel is inferred according to whether the client-to-server channel is still established; and wherein the server does not prepare the response to the client request if the server-to-client channel is inferred to be closed.

3. The method of claim 1, wherein the server includes a read buffer; wherein the client request is read from the read buffer; and wherein the read buffer is then probed to determine whether the client-to-server channel is still established.

4. The method of claim 1, wherein the server maintains local information about the state of the client-to-server channel; wherein a specific state of the client-to-server channel is determined by examining the local information;

and wherein the response preparation is aborted if the local information indicates that the client-to-server channel is in the specific state.

5. The method of claim 4, wherein the client-to-server channel is determined to be no longer established if the local information indicates that the client-to-server channel is in a "CLOSE_WAIT" state.

6. The method of claim 1, wherein the state of the client-to-server channel is determined by polling the local information while a response to the client request is being prepared, whereby upon determination that the client-to-server channel is no longer established the response preparation is aborted before the response is prepared by the server for sending to the client.

7. The method of claim 1, further comprising:
responsive to receiving said request, the server beginning to prepare the response to the requesting client;
generating an interrupt on the server when the client-to-server channel is determined to be no longer established; and
responsive to said interrupt, the server aborting preparing the response before the response is prepared for sending to the requesting client.

8. The method of claim 1 wherein said server is a web server.

9. A server comprising:
a processing unit;
first means for maintaining a queue of connections based on connection requests, each connection communicatively coupling the server with an external client via a communication network, and each connection including a client-to-server channel and a server-to-client channel;
second means for accepting connections from the queue;
third means for examining local server information to determine whether the client-to-server channel of a given connection from the queue is still established; and
fourth means for aborting response preparation if it is determined that the client-to-server channel of the given connection is no longer established.

10. The server of claim 9 wherein said communication network is the Internet.

11. The server of claim 9 wherein said server is a web server for serving web pages to clients via said communication network.

12. An article for a server including a processing unit and a network interface card, the article comprising:
computer memory; and
a server program encoded in the computer memory, the server program commanding the processing unit to
(a) accept network connections for communicatively coupling the server with external clients via a communication network, each connection having a client-to-server channel and a server-to-client channel,
(b) before a response to a client requesting the response is prepared by the server, examine local server information to determine whether the client-to-server channel of a connection with the requesting client is still established, and
(c) abort response preparation if the client-to-server channel of the connection with the requesting client is determined to be no longer established.

13. The article of claim 12, wherein a state of the server-to-client channel of the connection with the requesting client is inferred according to whether the corresponding client-to-server channel is still established.

14. The article of claim 12, wherein the memory is further encoded with local information about a state of the connection with the requesting client; wherein the state of the connection with the requesting client is determined by examining the local information; and wherein response preparation is aborted if the local information indicates that the client-to-server channel of the connection with the requesting client is in the specific state.

15. The article of claim 12, wherein a state of the client-to-server channel of the connection with the requesting client is determined by polling the local information, the local information being polled concurrently with the server beginning to prepare the client request.

16. The article of claim 12, wherein the memory is further encoded with a routine for commanding the processing unit to generate an interrupt when the client-to-server channel of the connection with the requesting client is determined to be no longer established, and wherein responsive to the interrupt the server aborts the response preparation before a response is prepared for sending to the requesting client.

17. The article of claim 12 wherein the communication network is one selected from the group consisting of:
a wide area network, a local area network, the Internet.

18. The article of claim 12 wherein the server is a web server.

19. A computer program executable by a processing unit, the program comprising instructions stored to computer-readable media, the instructions comprising:
instructions for commanding a processing unit of a server computer to maintain a queue of network connections with external clients based on connection requests;
instructions for commanding the processing unit to accept connections from the queue;
instructions for commanding the processing unit to examine local server information to determine whether a client-to-server channel of an accepted connection from the queue is still established;
instructions for commanding the processing unit to process a client request associated with the accepted connection to prepare a response to the client if the client-to-server channel of the accepted connection is first determined as still established; and
instructions for commanding the processing unit to forego response preparation for the associated client request if the client-to-server channel of the accepted connection is determined as no longer established.

20. The method of claim 8 wherein said response is a web page requested by the requesting client.

21. The computer program of claim 19 wherein said server computer is a web server.

22. The computer program of claim 21 wherein said client request is a request for a web page.

* * * * *

UNITED STATES PATENT AND TRADEMARK OFFICE
CERTIFICATE OF CORRECTION

PATENT NO. : 7,376,741 B1 Page 1 of 1
APPLICATION NO. : 09/272810
DATED : May 20, 2008
INVENTOR(S) : Richard J. Carter et al.

It is certified that error appears in the above-identified patent and that said Letters Patent is hereby corrected as shown below:

On the Title page, Item (73), in "Assignee", in column 1, line 2, delete "Corporation" and insert -- Company --, therefor.

Signed and Sealed this

Twentieth Day of January, 2009

JON W. DUDAS
*Director of the United States Patent and Trademark Office*